Patented July 28, 1953

2,647,112

UNITED STATES PATENT OFFICE 2,647,112

STABLE WATER-SOLUBLE SALTS OF SULFURIC ACID ESTERS OF LEUCO-ANTHRAQUINONE AZO-DYESTUFFS

Karl Glenz, Basel, Switzerland, assignor to Durand & Huguenin A. G., Basel, Switzerland, a Swiss company No Drawing. Application July 16, 1951, Serial No. 237,056. In Switzerland July 21, 1950

6 Claims. (Cl. 260—157)

According to this invention valuable new salts of sulphuric acid esters of leuco-anthraquinone azo-dyestuffs corresponding, in the form of the free acids, to the general formula

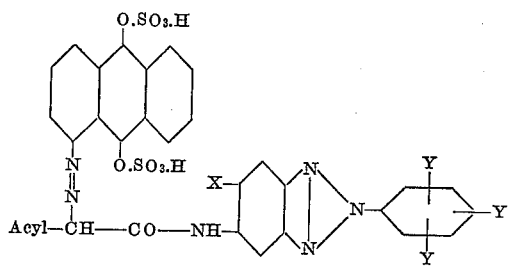

in which "acyl" represents the residue $CH_3.CO-$,

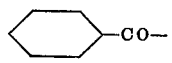

or

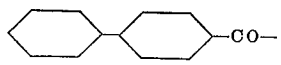

X represents hydrogen, alkyl or alkoxy, and each Y represents hydrogen, halogen, alkyl or alkoxy,
are made by coupling diazotised 1-aminoanthraquinone with a 5-acylacetylamino-2-phenyl-1:3-benztriazole of the general formula

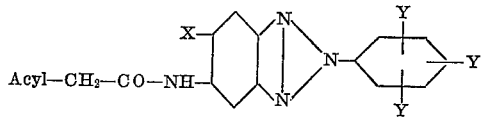

in which "acyl," X and Y have the meanings given above, and converting the resulting azo dyestuff into a stable water-soluble sulphuric acid ester salt of its leuco compound.

Conversion of the vat dyestuff into the sulphuric acid ester of its leuco compound is carried out by converting the dyestuff into its leuco compound, for example, by means of a reducing agent which reduces the quinone grouping but not the azo group, and esterifying the latter with sulphur trioxide or a substance yielding sulphur trioxide, such as chlorosulphonic acid in the presence of a tertiary base such, for example, as pyridine, and in the presence of a metal such, for example, as copper, brass or iron.

The 5-acylacetylamino-2-phenyl-1:3-benztriazoles can be prepared by coupling a diazotised amine of the general formula

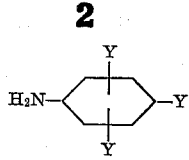

in which each Y has the meaning given above, in an acid medium with a 1:3-diaminobenzene of the general formula

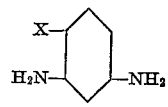

in which X has the meaning given above, and treating the resulting monoazo-dyestuff of the formula

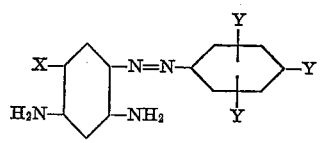

in which X and Y have the meanings given above, with an oxidising agent such, for example, as $CuSO_4/NH_3$ (see Schmidt, Berichte der Deutschen Chemischen Gesellschaft, vol. 54, page 2191).

The resulting 5-amino-2-phenyl-1:3-benztriazole of the formula

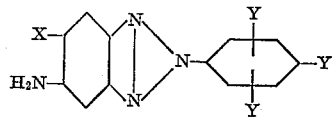

is condensed by a method in itself known with an acylacetic acid ester such, for example, as acetoacetic acid ethyl ester, benzoyl-acetic acid ethyl ester or the para-phenyl-benzoyl-acetic acid ethyl ester used in British Patent No. 607,219.

Especially valuable leuco sulphuric acid esters are obtained by esterifying the monoazo-dyestuffs from diazotised 1-aminoanthraquinone and, for example, any one of the following compounds:

5-acetoacetylamino-2-phenyl-1:3-benztriazole,
5 - acetoacetylamino - 6 - methoxy - 2 - phenyl - 1:3-benztriazole,
5 - acetoacetylamino - 6 - ethoxy - 2 - phenyl - 1:3-benztriazole,
5 - acetoacetylamino - 2 - (4' - chloro) - phenyl - 1:3-benztriazole,
5 - acetoacetylamino - 6 - methyl - 2 - (3' - chloro)-phenyl-1:3-benztriazole, 5 - acetoacetylamino - 6 - ethyl - 2 -(3' - chloro)-phenyl-1:3-benztriazole,
5 - acetoacetylamino - 6 - methyl - 2 - (2' - methyl)-phenyl-1:3-benztriazole,
5 - acetoacetylamino - 6 - butoxy - 2 - (2' - methyl)-phenyl-1:3-benztriazole,
5 - acetoacetylamino - 6 - methyl - 2 - (2' - ethyl)-phenyl-1:3-benztriazole,
5 - acetoacetylamino - 2 - (4' - methoxy) - phenyl-1:3-benztriazole,
5 - acetoacetylamino - 2 - (4' - ethoxy) - phenyl-1:3-benztriazole,
5 - acetoacetylamino - 6 - methoxy - 2 - (4' - methoxy)-phenyl-1:3-benztriazole,
5 - acetoacetylamino - 2 - (2' - methyl - 4' - chloro)-phenyl-1:3-benztriazole,
5 - acetoacetylamino - 2 - (2' - ethyl - 4' - chloro)-phenyl-1:3-benztriazole,
5 - acetoacetylamino - 6 - methyl - 2 - (2':5' - dimethyl)-phenyl-1:3-benztriazole,
5 - acetoacetylamino - 6 - methyl - 2 - (2':5' - diethyl)-phenyl-1:3-benztriazole,
5- acetoacetylamino-6- methoxy-2-(2'- methoxy-5'-methyl)-phenyl-1:3-benztriazole,
5-acetoacetylamino-2-(2':5'-dimethoxy)-phenyl-1:3-benztriazole,
5-acetoacetylamino-6-methoxy-2-(2':5'- dimethoxy-4'-chloro)-phenyl-1:3-benztriazole,
5-benzoylacetylamino-6- methoxy-2- phenyl-1:3-benztriazole,
5- benzoylacetylamino- 6- methoxy- 2- (4'- methoxy)-phenyl-1:3-benztriazole,
5-benzoylacetylamino-6-methoxy-2-(4'-butoxy)-phenyl-1:3-benztriazole,
5- benzoylacetylamino-2- (4'- methoxy)- phenyl-1:3-benztriazole,
5-benzoylacetylamino-6-methyl-2-(2':5'-dimethoxy)-phenyl-1:3-benztriazole,
5-benzoylacetylamino-6- propyl-2-(2':5'- dimethoxy)-phenyl-1:3-benztriazole,
5-para- phenyl- benzoylacetylamino-6- methoxy-2-(4'-methoxy)-phenyl-1:3-benztriaole,
5-para-phenyl- benzoylacetylamino-2-(4'- methoxy)-phenyl-1:3-benztriazole,
5-para- phenyl- benzoylacetylamino-6- methoxy-2-(2'-methyl)-phenyl-1:3-benztriazole, and
5-para- phenyl- benzoylacetylamino-6- methoxy-2-(2'-butyl)-phenyl-1:3-benztriazole.

The new leuco sulphuric acid esters are distinguished by a very good affinity for vegetable fibers and by very good properties of fastness.

The following examples illustrate the invention, the parts being by weight:

Example 1

25 parts of the dyestuff obtained by coupling diazotised 1-amino-anthraquinone with 5-acetoacetylamino-2-phenyl-1:3-benztriazole are introduced into a mixture prepared by introducing dropwise 37 parts of chlorosulphonic acid into 185 parts of pyridine boiling at 125-128° C., and 15 parts of iron powder are added to the mixture. After stirring for several hours at 50° C. the esterification mixture is introduced into a solution of 60 parts of sodium carbonate and 1000 parts of water, and the pyridine is distilled off in vacuo. The mixture is filtered to remove the iron sludge, and the ester is salted out by means of sodium chloride.

The new leuco sulphuric acid ester salt is soluble in water to give a yellow-orange solution, and yields a yellow vat dyestuff when suitably oxidised. By the methods of development customary for this class of dyestuffs there are produced on the fibre full yellow dyeings having very good properties of fastness.

Example 2

25 parts of the azo dyestuff from diazotised 1-aminoanthraquinone and 5-acetoacetylamino-6-methoxy-2-phenyl-1:3-benztriazole and 25 parts of iron powder are stirred for 5 hours at 40-50° C. with a mixture of 37 parts of chlorosulphonic acid and 180 parts of pyridine boiling at 125-128° C. The reaction mixture is poured into a solution of 60 parts of sodium carbonate in 1000 parts of water, the pyridine is distilled off in vacuo, the mixture is freed from iron sludge by filtration, and the ester is salted out from the filtrate by means of sodium chloride.

The new leuco sulphuric acid ester salt is soluble in water to give a yellow-orange solution and yields a yellow vat dyestuff when suitably oxidised. By the methods of development customary for this class of dyestuffs there are produced on the fibre reddish yellow dyeings having very good fastness properties.

Example 3

A mixture of 24 parts of the azo dyestuff, obtained from diazotised 1-aminoanthraquinone and 5-acetoacetylamino-2-(4'-methoxy)-phenyl-1:3-benztriazole, are introduced into a mixture of pyridine and $SO_3$, which mixture has been obtained by introducing dropwise 36 parts of chlorosulphonic acid in 180 parts of pyridine boiling at 125-128° C., and 14 parts of iron powder are introduced and the whole is stirred at 40° C. until the esterification is finished. The mixture is then introduced into a solution of 55 parts of sodium carbonate in 1000 parts of water, and the pyridine is removed by distillation. After filtering the mixture to remove the esterification residue, the ester is obtained from the filtrate by salting out with sodium chloride.

The new leuco sulphuric acid ester salt is soluble in water to form an orange solution and yields a yellow-orange vat dyestuff when suitably oxidised. By the methods of development usual for this class of dyestuffs there are produced on the fibre gold-yellow dyeings having very good properties of fastness.

Example 4

42 parts of chlorosulphonic acid are run, while cooling, into 210 parts of a pyridine fraction boiling at 125-128° C., and then 28 parts of the azodyestuff obtainable from diazotised 1-aminoanthraquinone and 5-acetoacetylamino-6-methoxy-2-(4'-methoxy)-phenyl-1:3-benztriazole are introduced in admixture with 17 parts of iron powder. The mixture is heated to 40° C. and, after stirring for several hours, the reaction mixture is added to a solution of 65 parts of sodium carbonate in 1000 parts of water. The solution obtained after removing the pyridine and filtering off the iron sludge is salted out with sodium chloride to isolate the ester.

The new leuco sulphuric acid ester salt is soluble in water to form an orange solution, and yields a yellow-orange vat dyestuff when suitably oxidised. By the methods of development customary for this class of dyestuffs there are produced on the fibre gold-yellow dyeings having excellent properties of fastness.

Example 5

By treating the azo-dyestuff obtainable by coupling diazotised 1-aminoanthraquinone and 5 - acetoacetylamino 1 - 6 - methyl - 2 - (2'-methyl) - phenyl - 1:3 - benztriazole in the manner described in Example 4, there is obtained a leuco sulphuric acid ester salt which is soluble in water to form a yellow-orange solution and yields a yellow vat dyestuff when suitably oxidised. By the methods of development customary for this class of dyestuffs there are produced on the fibre neutral yellow dyeings having very good properties of fastness.

Example 6

10 parts of the azo dyestuff produced by coupling diazotised 1 - aminoanthraquinone and 5 - benzoylacetylamino - 6 - methoxy - 2 - (4'-methoxy) - phenyl - 1:3 - benztriazole and 10 parts of copper powder are added to a mixture consisting of 20 parts of chlorosulphonic acid and 100 parts of a pyridine fraction boiling at 125–128° C., and the whole is stirred for several hours at 30° C. The reaction mixture is poured into ice water, whereupon a copper compound of the leuco sulphuric acid ester separates. The mixture is decanted to remove the precipitate, and treated with caustic soda solution to decompose the copper complex. The solution is filtered to remove the copper sludge and the leuco sulphuric acid ester is salted out from the filtrate in the form of its sodium salt.

The new leuco sulphuric acid ester salt is soluble in water to form a yellow-orange solution, and yields a yellow-orange vat dyestuff when suitably oxidised. By the methods of development customary for this class of dyestuff there are produced on the fibre vivid gold-yellow dyeings having very good properties of fastness.

Example 7

10 parts of the azo dyestuff resulting from diazotised 1 - aminoanthraquinone and 5 - para-phenyl-benzoylacetyl - amino - 6 - methoxy - 2- (4' - methoxy) - phenyl - 1:3 - benztriazole are esterified and worked up in a manner analogous to that described in Example 6. Instead of copper powder, brass powder can be used with the same success.

The new leuco sulphuric acid ester salt is soluble in water to form a yellow-orange solution, and yields a yellow-orange vat dyestuff when suitably oxidised. By the methods of development customary for this class of dyestuffs there are produced on the fibre gold-yellow dyeings having very good properties of fastness.

Instead of the 5 - acyl - acetylamino - 2 - phenyl - 1:3 - benztriazoles used in the foregoing examples there can be used with practically the same success any of the other 5 - acyl - acetyl-amino - 2 - phenyl - 1:3 - benztriazoles hereinbefore named.

What I claim is:

1. Stable water-soluble salts of sulphuric acid esters of leuco-anthraquinone azo-dyestuffs, corresponding, in the form of the free acid, to the general formula in which acyl is a member selected from the group consisting of the radicals $CH_3.CO-$

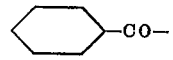

and

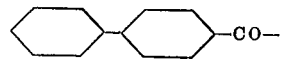

X is a member selected from the group consisting of hydrogen, alkyl and alkoxy, and each Y is a member selected from the group consisting of hydrogen, halogen, alkyl and alkoxy.

2. The stable water-soluble salt of sulphuric acid ester of leuco-anthraquinone azo-dyestuff, corresponding, in the form of the free acid, to the formula

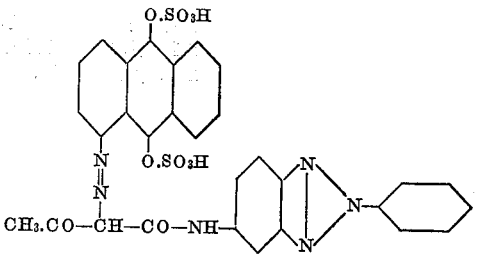

3. The stable water-soluble salt of sulphuric acid ester of leuco-anthraquinone azo-dyestuff, corresponding, in the form of the free acid, to the formula

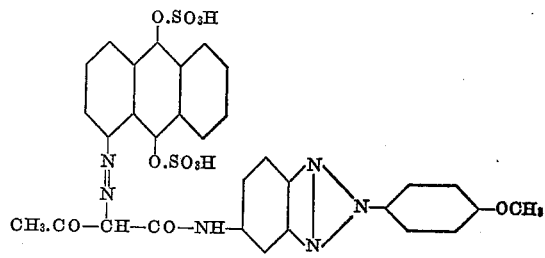

4. The stable water-soluble salt of sulphuric acid ester of leuco-anthraquinone azo-dyestuff, corresponding, in the form of the free acid, to the formula

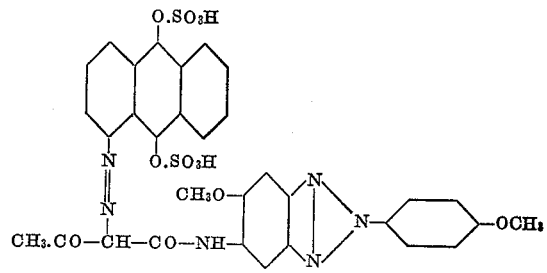

5. The stable water-soluble salt of sulphuric acid ester of leuco-anthraquinone azo-dyestuff, corresponding, in the form of the free acid, to the formula

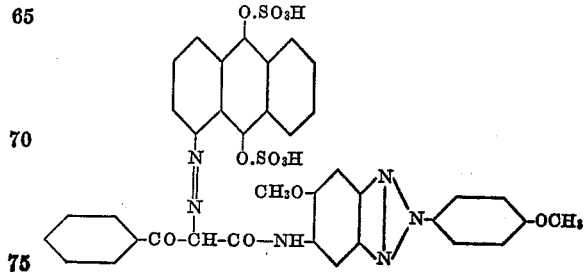

6. The stable water-soluble salt of sulphuric acid ester of leuco-anthraquinone azo-dyestuff, corresponding, in the form of the free acid, to the formula
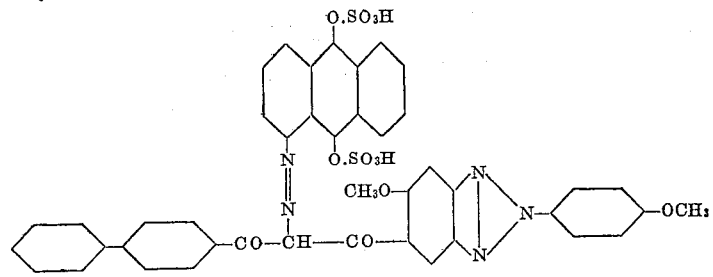
KARL GLENZ.
References Cited in the file of this patent
UNITED STATES PATENTS
| Number | Name | Date |
|---|---|---|
| 2,136,136 | Johner et al. | Nov. 8, 1938 |
| 2,175,803 | Honold et al. | Oct. 10, 1939 |